United States Patent
Dupont et al.

(10) Patent No.: US 7,812,274 B2
(45) Date of Patent: Oct. 12, 2010

(54) ROTARY KNOB FOR A MOTOR VEHICLE

(75) Inventors: Cedric Dupont, San Francisco, CA (US); Arne Stoschek, Palo Alto, CA (US); Bernhard Senner, Ingolstadt (DE)

(73) Assignee: Volkswagen AG, Wolfsburg (DE)

( * ) Notice: Subject to any disclaimer, the term of this patent is extended or adjusted under 35 U.S.C. 154(b) by 1008 days.

(21) Appl. No.: 10/572,694

(22) PCT Filed: Sep. 25, 2004

(86) PCT No.: PCT/EP2004/010795

§ 371 (c)(1),
(2), (4) Date: Nov. 8, 2006

(87) PCT Pub. No.: WO2005/047049

PCT Pub. Date: May 26, 2005

(65) Prior Publication Data

US 2007/0193814 A1    Aug. 23, 2007

Related U.S. Application Data

(60) Provisional application No. 60/512,886, filed on Oct. 20, 2003.

(51) Int. Cl.
*H01H 9/16* (2006.01)
(52) U.S. Cl. .................................... 200/316
(58) Field of Classification Search ............... 200/5 R, 200/336, 310–316, 61.54, 61.57; 341/22, 341/23, 28, 35; 345/168–170, 184; 362/84, 362/276

See application file for complete search history.

(56) References Cited

U.S. PATENT DOCUMENTS

| | | | |
|---|---|---|---|
| 5,270,689 A | | 12/1993 | Hermann |
| 5,335,743 A | * | 8/1994 | Gillbrand et al. ............ 180/178 |
| 5,861,589 A | * | 1/1999 | Sato et al. ................... 200/5 R |
| 6,207,913 B1 | * | 3/2001 | Nakajima et al. ........... 200/314 |
| 6,348,772 B1 | * | 2/2002 | May ........................... 318/430 |
| 6,456,260 B1 | | 9/2002 | Koenig et al. |
| 6,479,769 B1 | * | 11/2002 | Barat et al. ................. 200/5 R |
| 6,521,848 B2 | * | 2/2003 | Shibata et al. .............. 200/5 R |
| 6,608,271 B2 | * | 8/2003 | Duarte ....................... 200/311 |
| 6,744,374 B1 | * | 6/2004 | Kuenzner ............. 340/815.78 |

(Continued)

FOREIGN PATENT DOCUMENTS

DE    31 04 384    8/1982

(Continued)

OTHER PUBLICATIONS

Patent Abstracts of Japan, vol. 1998, No. 12, Oct. 31, 1998.

(Continued)

*Primary Examiner*—Michael A Friedhofer
(74) *Attorney, Agent, or Firm*—Kenyon & Kenyon LLP

(57) ABSTRACT

A rotary knob is for operating a motor vehicle by rotation of the rotary knob, the rotary knob having an at least partially transparent display layer which rotates along in response to an angular movement of the rotary knob, and a controllable light source for displaying changeable information on the display layer.

20 Claims, 8 Drawing Sheets

U.S. PATENT DOCUMENTS

| | | | |
|---|---|---|---|
| 7,038,147 B2 * | 5/2006 | Sasanouchi et al. | 200/5 R |
| 7,091,964 B2 * | 8/2006 | Wong et al. | 345/184 |
| 7,141,748 B2 * | 11/2006 | Tanaka et al. | 200/310 |
| 7,177,730 B2 * | 2/2007 | Daly et al. | 701/1 |
| 7,319,490 B2 * | 1/2008 | Kanamori et al. | 348/375 |
| 7,339,128 B2 * | 3/2008 | Yen | 200/314 |
| 7,414,206 B2 * | 8/2008 | Kikuya | 200/5 R |
| 7,462,795 B2 * | 12/2008 | Montalvo | 200/336 |
| 7,595,722 B2 * | 9/2009 | Heimermann et al. | 340/461 |
| 2004/0046751 A1 | 3/2004 | Heimermann et al. | |

FOREIGN PATENT DOCUMENTS

| | | |
|---|---|---|
| DE | 197 51 649 | 5/1999 |
| DE | 198 49 973 | 5/2000 |
| DE | 198 57 837 | 6/2000 |
| DE | 199 41 960 | 3/2001 |
| DE | 101 39 693 | 5/2001 |
| EP | 0 329 920 | 8/1989 |
| EP | 0 366 132 | 12/1994 |
| EP | 0 771 681 | 5/1997 |
| EP | 1 089 307 | 4/2001 |
| EP | 1 168 231 | 1/2002 |
| GB | 2 093 240 | 8/1982 |
| JP | 10-188733 | 7/1998 |
| WO | WO 03/036455 | 5/2003 |
| WO | WO 03/036553 | 5/2003 |

OTHER PUBLICATIONS

International Search Report, PCT International Patent Application No. PCT/EP2004/010795, Jan. 21, 2005.

International Preliminary Report on Patentability and Written Opinion of the International Searching Authority, PCT/EP2004/010795 dated Jul. 27, 2006 (translation provided).

\* cited by examiner

ROTARY KNOB FOR A MOTOR VEHICLE

CROSS-REFERENCE TO RELATED APPLICATIONS

The present application claims the benefit of U.S. Provisional Patent Application No. 60/512,886, filed on Oct. 20, 2003.

FIELD OF THE INVENTION

The present invention relates to a rotary knob for operating a motor vehicle by rotating the rotary knob.

BACKGROUND INFORMATION

Certain rotary knobs are described, for example, in German Published Patent Application No. 101 39 693. According to German Published Patent Application No. 101 39 693, in the context of modern electronic devices in a vehicle that constantly offer additional functions with more and more options, multi-function operating elements, by which various functions of the connected devices can be performed, have been produced because of the limited installation space for the associated operating elements. European Published Patent Application No. 0 366 132 describes, for example, a multifunction operating device for motor vehicles, where function groups and individual functions are selected with the aid of a rotary switch, and where an ENTER function can be triggered, one and the same bidirectional rotary switch being used for selecting menus and individual functions. This rotary switch has click-stop positions, to which menus or individual functions are assigned, the ENTER function being able to be initiated by an axial motion of the rotary switch. Such a multifunction operating device is used, for example, to enter the destination of a navigation system. To this end, an alphanumeric keyboard is illustrated on a display unit, the user being able to move forwards and backwards in the alphanumeric keyboard with the aid of the bidirectional motion of the rotary switch. When the cursor is situated on the desired alphanumeric character, the latter can be selected by an axial motion of the rotary switch and transferred into the navigation system. German Published Patent Application No. 199 41 960 describes that an operating element can be designed as a cylinder, which is bidirectionally rotatable about its longitudinal axis and elastically movable with respect to the longitudinal axis.

For convenient operation, and in order to simplify operating haptics, German Published Patent Application No. 101 39 693 describes that a bidirectional rotary element be formed, having an axis of rotation extending in a direction essentially parallel to a vehicle-part surface. Using the bidirectional rotary element, a bidirectional preselection and/or selection of function groups and/or functions is made within a menu level. Selection of the menu planes is accomplished via a second operating device. The second operating device can be implemented by moving the bidirectional rotary element parallelly to the axis of rotation of the bidirectional rotary element. To form the second operating device, a further variant provides for the bidirectional rotary element taking the form of a rocker in the direction of the axis of rotation. Another solution provides a second operating-device, which has two operating elements that are preferably manipulable in a direction parallel to the axis of rotation of the bidirectional rotary element. The second operating device is situated on or at least partially in the bidirectional rotary element and constitutes a unit with the rotary element. In addition, the bidirectional rotary element is designed for preselection and/or selection in two directions on the indicating apparatus, and the second operating device is designed for selection in two further directions, preferably perpendicular to the selection directions of the bidirectional rotary element.

Also described in German Published Patent Application No. 31 04 384 is an electrical-unit switch having displays, where a counter records the circuit state brought about by manually operating a freely accessible rotary not, and supplies it to a stationary, electronically functioning display field in accordance with the count, the display field and the rotary knob being situated close together, and a switching contact, which is operated by an actuating shaft supporting the rotary knob, interacting with the counter. In this context, it is possible to look at the rotary knob and display at the same time, since the electronic display field is built into the rotary knob on its front end face, the electronic display field being supported by a connecting piece projecting above the rotary knob in the rearward axial direction, and the front end face of the rotary knob being essentially transparent all around.

In addition, a push-button switch having a housing and a switching part displaceably supported in it is described in European Published Patent Application No. 0 329 920. A pushbutton cap used as a manipulating element has a base part having a tubular extension latched to the switching part, and a removable, at least partially transparent, protective cap. An LED or LCD display element having at least one light-emitting diode and/or one liquid-crystal display is situated in a cavity delimited by the base part and the protective cap, the LED or LCD display element being essentially formed by a wafer that is right-angled in the sliding direction of the pushbutton cap, and even being provided with electrical terminals.

A rotary knob is also described in European Published Patent Application No. 0 771 681.

SUMMARY

According to an example embodiment of the present invention, a rotary knob is for operating a motor vehicle by rotation of the rotary knob, the rotary knob having a (an at least) partially transparent display layer that rotates along in response to an angular movement of the rotary knob, and a controllable light source for displaying changeable information on the display layer or for projecting the changeable information onto the display layer. The rotary knob may have an axis of rotation, which is aimed to a considerable extent, or essentially aimed, at an observer. An axis of rotation may be essentially orthogonal to the display layer.

The display layer may have a side facing an operator and a side facing away from the operator, the side facing away from the operator being able to be illuminated by the controllable light source. In this context, light may be projected onto the side of the display layer facing away from the operator, in the form of an image that is visible on the side of the display layer facing the operator.

The controllable light source may be situated optically in back of the display layer, e.g., at a distance of 2 cm to 7 cm away from the display layer, as viewed from the side of the display layer facing the operator.

The controllable light source may include a laser.

A movable light beam (whose point of incidence on the display layer is changeable) may be produced by the controllable light source.

The rotary knob may have a scattering lens situated between the controllable light source and the display layer.

A reflecting mirror, e.g., a curved one for deflecting a light beam, may be (optically) situated between the controllable light source and the display layer.

A prism for bending a light beam, e.g., one having a curved reflecting surface, may be (optically) situated between the controllable light source and the display layer.

According to an example embodiment of the present invention, an operator device is for operating a motor vehicle, having at least two above-mentioned rotary knobs which may be functionally usable independently of each other. Different information items may be simultaneously displayable on the display layers of the rotary knobs. The same time may mean the same time in the strict sense of the word, but the same time in the present context may also include different points in time, which are so close together that the human eye perceives images, which it sees at these different points in time, as simultaneously displayed images.

The rotary knobs may have a common light source for displaying, e.g., different information items on their display layers.

In a multifunction operating device for a motor vehicle, the multifunction operating device may have a display and an above-mentioned rotary knob and/or an above-mentioned operator device for preselecting and/or selecting menu items representable on the display.

Menu items, e.g., selected ones, which are representable or represented on the display, may be simultaneously representable on the display layer.

A motor-vehicle steering wheel may include an above-mentioned rotary knob and/or an above-mentioned operator device.

At least one rotary knob may be situated less than 4 cm, e.g., less than 3 cm away from an edge of the steering wheel.

A motor-vehicle steering wheel may include an above-mentioned rotary knob, an above-mentioned operator device, an above-mentioned steering wheel, and/or an above-mentioned multifunction operating device.

A motor-vehicle within the present context may include, e.g., a land vehicle that may be used individually in traffic. In particular, motor vehicles within the present context are not restricted to land vehicles having an internal combustion engine.

Further aspects and features of example embodiments of the present invention are described in more detail below with reference to the appended Figures.

DETAILED DESCRIPTION

Figure 1:
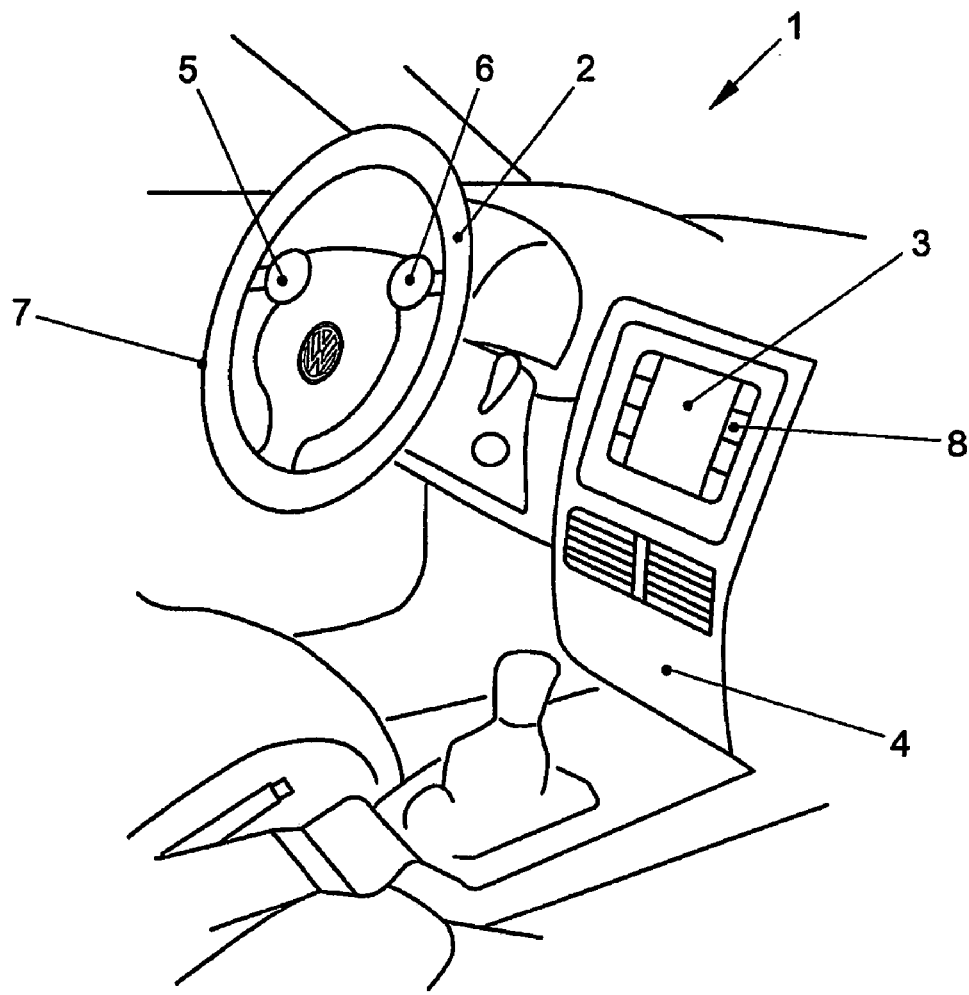
FIG. 1 is an internal view of a motor vehicle.

FIG. 1 is an internal view of a motor vehicle 1 having a steering wheel 2. A display 3 situated in a console 4 and two rotary knobs 5 and 6 positioned on steering wheel 2 are situated in motor vehicle 1. Rotary knobs 5 and 6 are positioned approximately 3 cm away from an edge 7 of steering wheel 2. Alternatively, or in addition, rotary knobs may also be positioned in the region of console 4. In addition, operating elements 8 are situated in the region of display 3.

Figure 2:
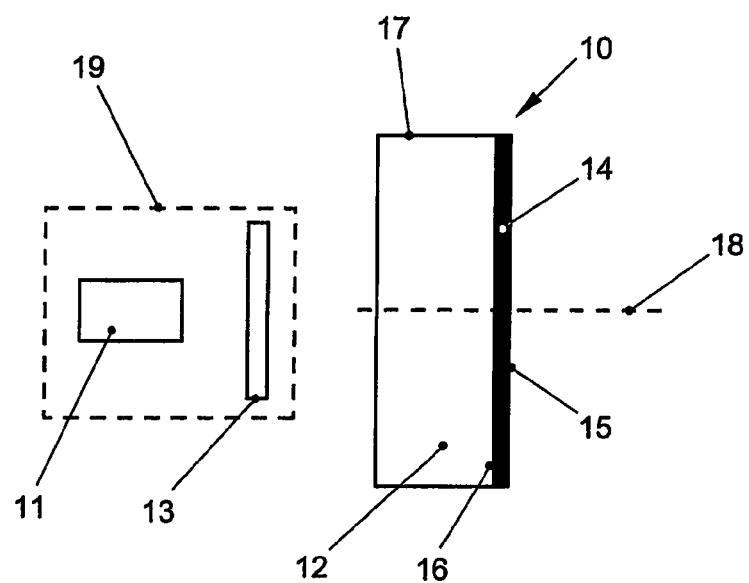
FIG. 2 is a cross-sectional view of an exemplary embodiment of a rotary knob.

FIG. 2 is a cross-sectional view of a rotary knob 10 as an exemplary embodiment of rotary knob 5 and/or rotary knob 6. Rotary knob 10 has a rotating body 12, which includes an at least partially transparent display layer 14 that rotates along in response to an angular movement of rotary knob 10. Display layer 14 has a side 15 facing an operator and a side 16 facing away from the operator. Rotating body 14 may include an axis of rotation 18, which is essentially pointed at an observer. In this context, axis of rotation 18 may be oriented essentially orthogonally to display layer 14.

Rotary knob 10 also has a controllable light source 19 for representing changeable information on display layer 14 or projecting the changeable information on the side 16 of display layer 14 facing away from the operator. In this context, light is projected onto the side 16 of the display layer 14 facing away from the operator, in the form of an image that is visible on the side 15 of display layer 14 facing the operator. Reference numeral 17 designates a side wall of the rotating body.

Controllable light source 19 includes a fixed light source 11 and a template 13, which may be changed by a changing mechanism, different images being projectable onto display layer 14 by changing template 13.

Figure 3:
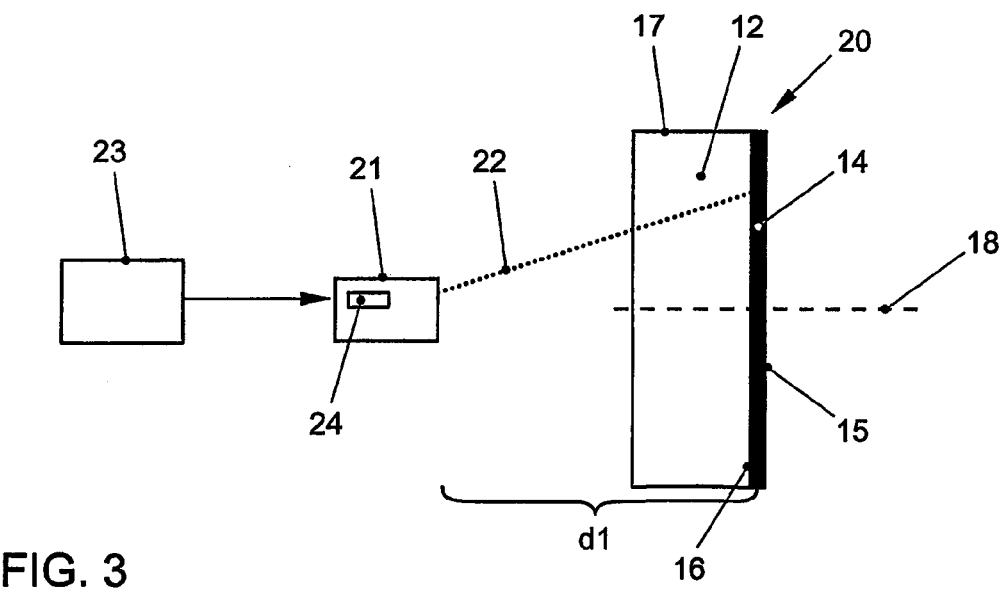
FIG. 3 is a cross-sectional view of a further exemplary embodiment of a rotary knob.

FIG. 3 is a cross-sectional view of a rotary knob 20 as an exemplary embodiment of rotary knob 5 and/or rotary knob 6. Identical or similar elements are designated by the same reference numerals. Rotary knob 20 has a rotating body 12 having an at least partially transparent display layer 14, which rotates along in response to an angular movement of rotary knob 20. In addition, rotary knob 20 has a light source 21, which is controllable by a control unit 23 and has a laser by which a light beam 22 is movable across display layer 14. Due to the inertia of the human eye, an image is made visible to the operator on the side 15 of display layer 14 facing the operator, by suitably switching light beam 22 on and off and rapidly moving light beam 22 across display layer 14. Seen from the side 15 of display layer 14 facing the operator, controllable light source 21 is positioned optically behind display layer 14 at a distance d1 of, e.g., 2 cm to 7 cm away from display layer 14.

Light beam 22, which is produced by laser 24, is moved by a suitable mechanism, such as that described, for example, in PCT International Published Patent Application No. WO 03/0365553 and European Published Patent Application No. 1 168 231. A controllable light source 21 may be available, for example, from Symbol Technologies, Inc., Holtsville, N.Y. 11742, U.S.A., or from Microvision, Inc., 19910 North Creek Parkway, Bothell, Wash. 98011, U.S.A. Further details of such controllable light sources may also be extracted from the Internet pages of Symbol Technologies, Inc., e.g., www.symbol.com/products/oem/lpd.html.

The mechanism suitable for moving light beam 22, and laser 24, may be spatially separated and, e.g., connected by an optical waveguide.

Figure 4:
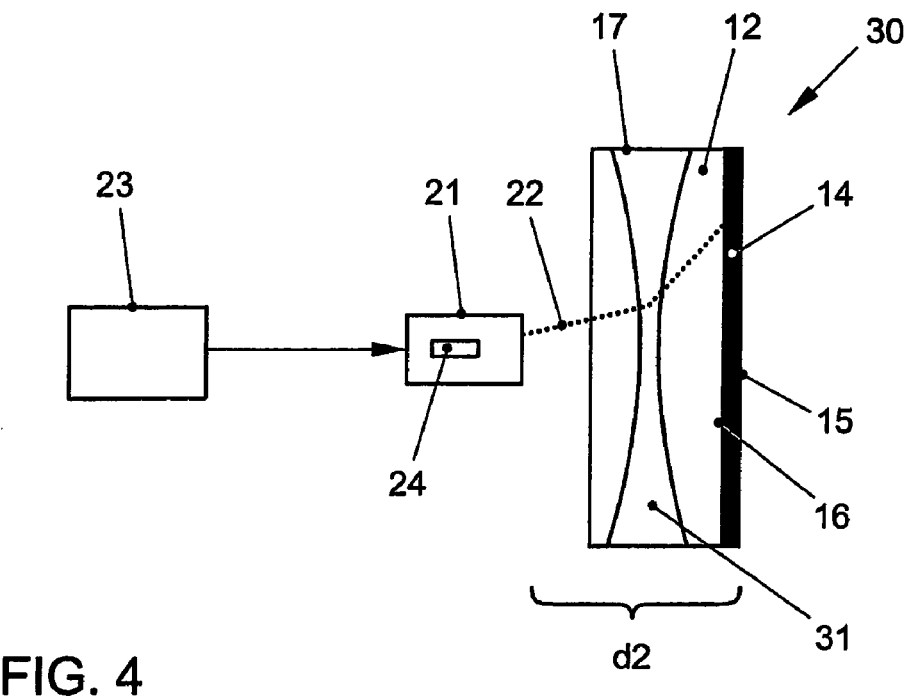
FIG. 4 is a cross-sectional view of a further exemplary embodiment of a rotary knob.

FIG. 4 is a cross-sectional view of a further exemplary embodiment of a rotary knob 30. In this case, a scattering lens 31 is provided between controllable light source 21 and display layer 14. When viewed from the side 15 of display layer 14 facing the operator, controllable light source 21 is positioned optically behind display layer 14, but at a distance d2 of, e.g., 1 cm to 4 cm away from display layer 14.

Figure 5:
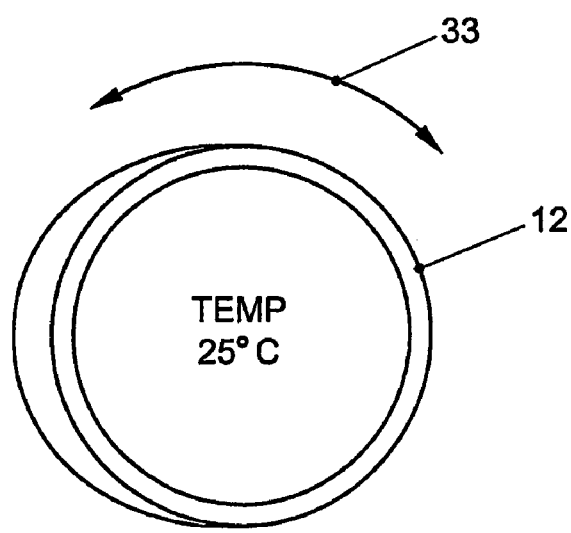
FIG. 5 is a perspective view of a rotating body.

FIG. 5 is a perspective view of rotating body 12 at a time at which "TEMP 25° C." is displayed on display layer 14 by light beam 22. Rotating body 12 may rotate in the direction of double arrow 33, i.e., clockwise and counterclockwise. A rotation of rotating body 12 is measured by a suitable mechanism. Exemplary embodiments of such a mechanism are described, for example, in German Published Patent Application No. 31 04 384 or European Published Patent Application No/0 771 681. In the present exemplary embodiment, the display "TEMP 25° C." on display layer 14 indicates a setpoint temperature of 25° C. set by an air-conditioning system. The setpoint temperature is decreased by rotating rotating body 12 counterclockwise and increased by rotating rotating body 12 clockwise. The corresponding, new setpoint temperature is displayed on display layer 14.

Other languages may be set for the same functionality, using an operator device, which is for control unit 23. In this context, not only Latin letters, but also complex characters, such as those illustrated in FIG. 6 and FIG. 7, may be displayed by the rotary knob. Thus, rotating body 12 in FIG. 6 displays "Temperature 25° C." in the Korean language, and the rotating body in FIG. 7 displays "Temperature 25° C." in the Chinese language.

Figure 8:
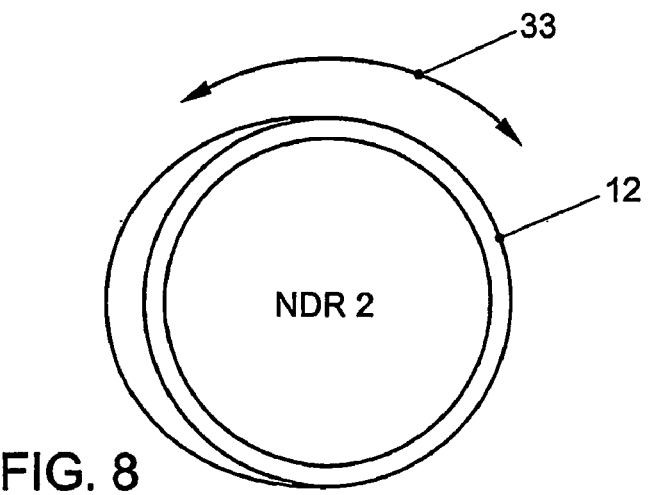
FIG. 8 is a perspective view of a rotating body.

Other functions may also be set by the operator device or an additional operator device for control unit 23. Thus, FIG. 8 illustrates the use of rotating body 12 for adjusting a radio. In this context, a received frequency or, as illustrated in FIG. 8, a selected radio station may be displayed on display layer 14. The received frequency or the selected radio station may be changed by rotating rotating body 12 clockwise or counterclockwise.

The, operator devices may be, for example, part of operating elements 8 illustrated in FIG. 1.

Figure 9:
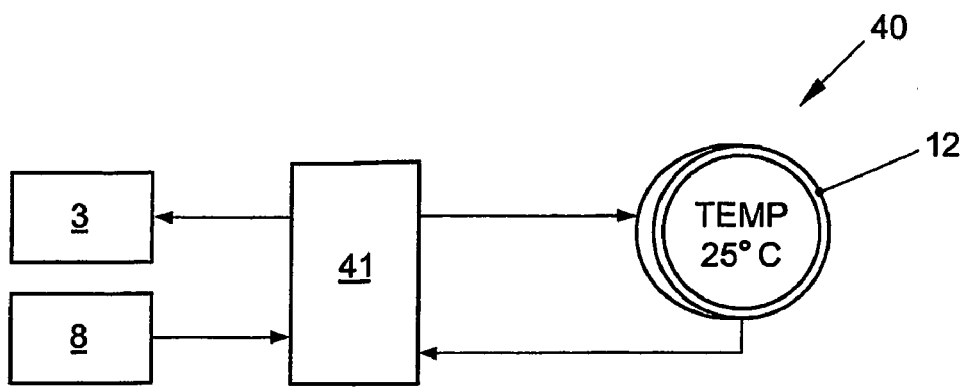
FIG. 9 illustrates a multifunction operating device.

FIG. 9 illustrates an exemplary embodiment of a multifunction operator device 40. In the present exemplary embodiment, multifunction operator device 40 has a rotary knob 20 or 30. However, only rotating body 12 is illustrated. Multifunction operating device 40 has a control unit 41 for controlling controllable light source 21 and evaluating the angular position of rotating body 12.

In addition, display 3 and operating elements 8, or a part of operating elements 8, are components of multifunction operating device 40. A multifunction operating device such as that as described in German Published Patent Application No. 101 39 693 is further developed with the aid of multifunction operating device 40 illustrated in FIG. 9, rotary knob 20 or 30 replacing rotary element 11 described in German Published Patent Application No. 101 39 693, and operating elements 8 or a part of operating elements 8 corresponding to softkeys 36 of German Published Patent Application No. 101 39 693.

Figure 6:
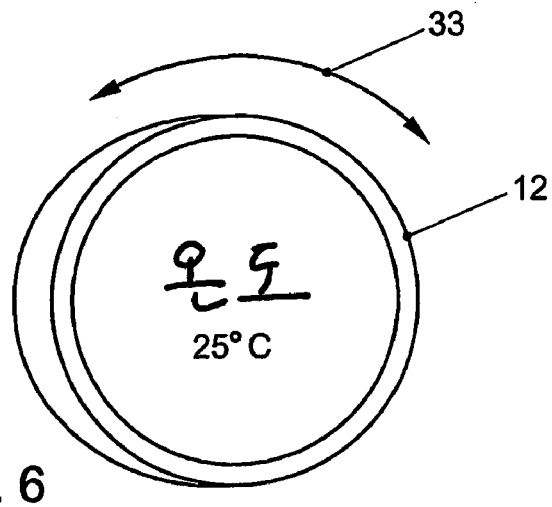
FIG. 6 is a perspective view of a rotating body.
Figure 7:
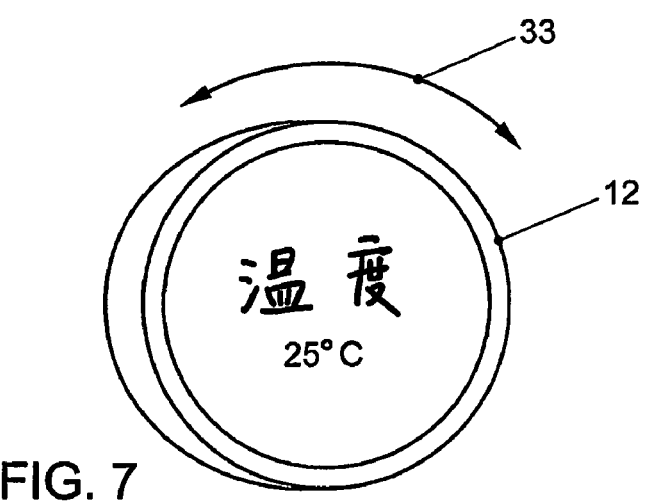
FIG. 7 is a perspective view of a rotating body.
Figure 10:
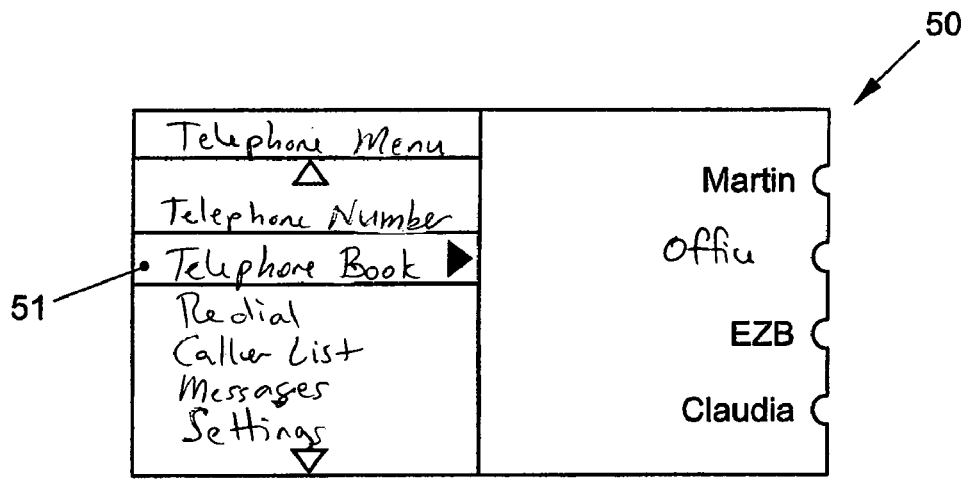
FIG. 10 illustrates a screen form.
Figure 11:
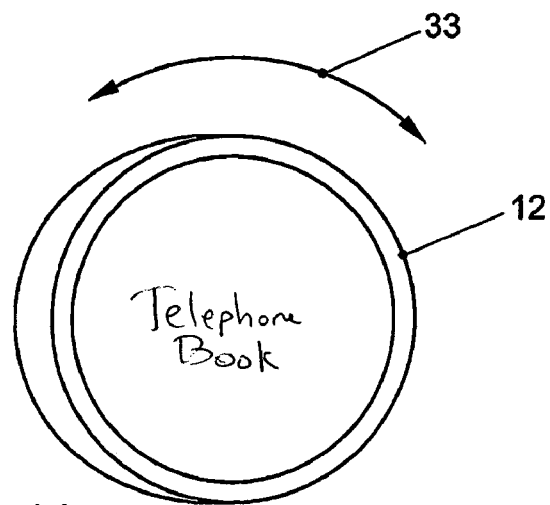
FIG. 11 is a perspective view of a rotating body.

FIG. 10 illustrates an exemplary embodiment of a telephone screen form 50, which corresponds to a display according to FIG. 6 of German Published Patent Application No. 101 39 693. Reference numeral 51 designates a selected menu line or a selected menu item. It is provided that the content of a selected menu line, i.e., the selected menu item, is reproduced on display layer 14, as illustrated in FIG. 11. Thus, the content of selected menu line 51 in FIG. 10 is the "telephone book" function, which is reproduced on display layer 14. By rotating rotating body 12 counterclockwise, selected menu line 51 is moved up, e.g., to the "telephone number" function. In this case, display layer 14 displays the words "telephone number". By rotating rotating body 12 clockwise, selected menu line 51 is moved down, e.g. to the "messages" function. In this case, display layer 14 displays the word "messages".

Figure 12:
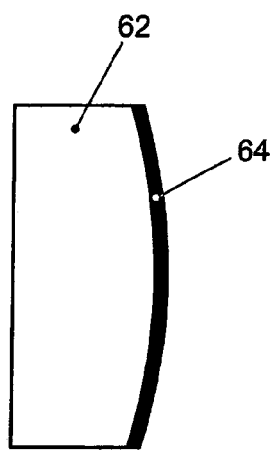
FIG. 12 is a cross-sectional view of a rotary knob.
Figure 13:
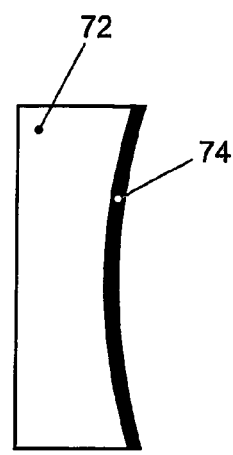
FIG. 13 is a cross-sectional view of a rotary knob.
Figure 14:
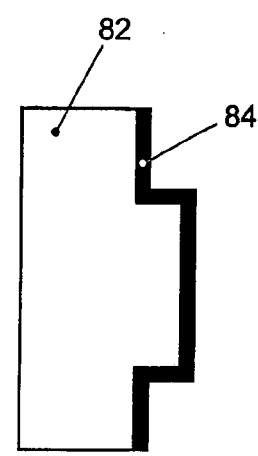
FIG. 14 is a cross-sectional view of a rotary knob.

In the exemplary embodiments illustrated in FIG. 2, FIG. 3, and FIG. 4, display layer 14 is flat. However, other geometric forms of the display layer are also possible. Thus, FIG. 12, FIG. 13, and FIG. 14 each illustrate a cross-section of an exemplary embodiment of a rotating body 62, 72, and 82, respectively, having a convex display layer 64, a concave display layer 74, and a graded display layer 84, respectively. Such rotating bodies 62, 72, and 82 may replace both rotating body 12 illustrated in FIG. 2, FIG. 3, and FIG. 4, and rotating bodies 12 and 212 illustrated in FIG. 15, FIG. 16, FIG. 17, FIG. 18, FIG. 19, and FIG. 20.

Figure 15:
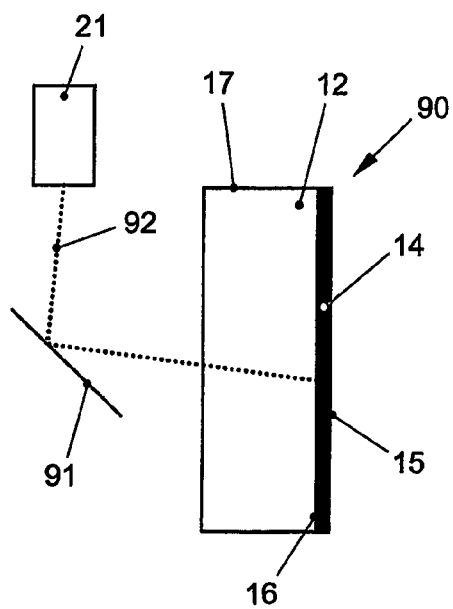
FIG. 15 is a cross-sectional view of a a rotary knob.
Figure 16:
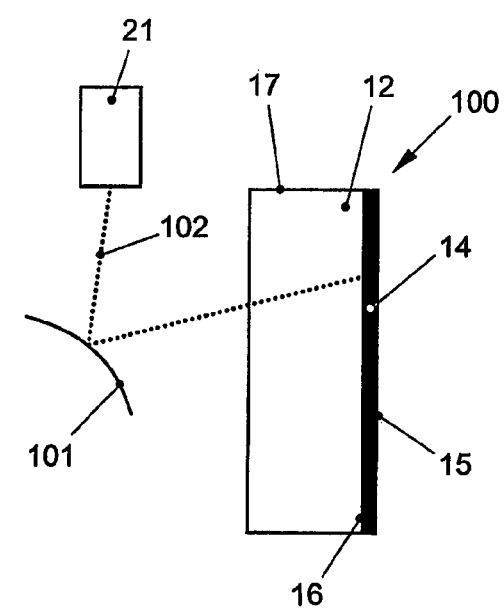
FIG. 16 is a cross-sectional view of a a rotary knob.

FIG. 15 and FIG. 16 each illustrate a cross-section of a further exemplary embodiment of a rotary knob 90 and 100, respectively, a light beam 92 and 102 being directed onto display layer 14 with the aid of a mirror 91 and 101, respectively, which is positioned between controllable light source 21 and display layer 14. Mirror 91 of rotary knob 90 is flat, while mirror 101 of rotary knob 100 is curved.

Figure 17:
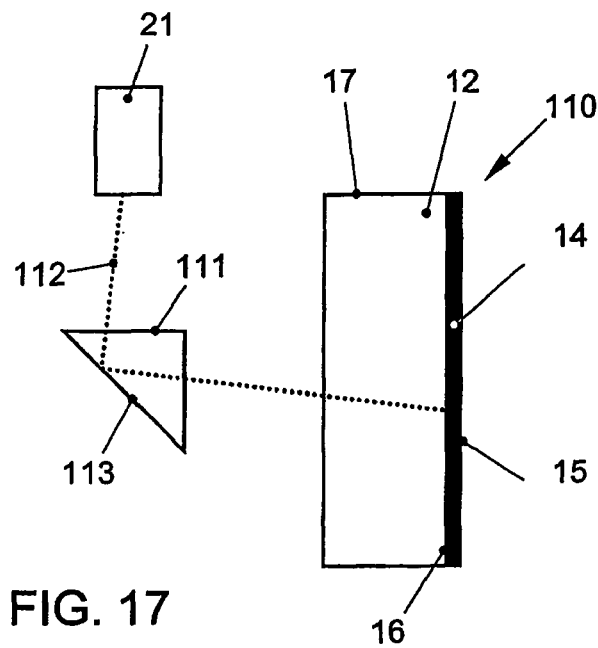
FIG. 17 is a cross-sectional view of a rotary knob.
Figure 18:
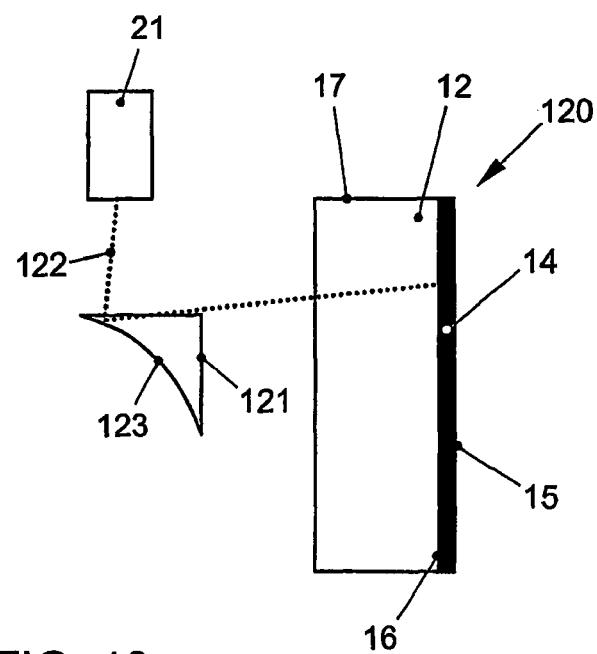
FIG. 18 is a cross-sectional view of a rotary knob.

FIG. 17 and FIG. 18 each illustrate a cross-section of a further exemplary embodiment of a rotary knob 110 and 120, respectively, a light beam 112 and 122 being directed onto display layer 14 with the aid of a prism 111 and 121, respectively, which is positioned between controllable light source 21 and display layer 14. Prism 111 of rotary knob 110 has a flat reflecting surface 113, while prism 121 of rotary knob 120 has a curved reflecting surface 123.

Figure 19:
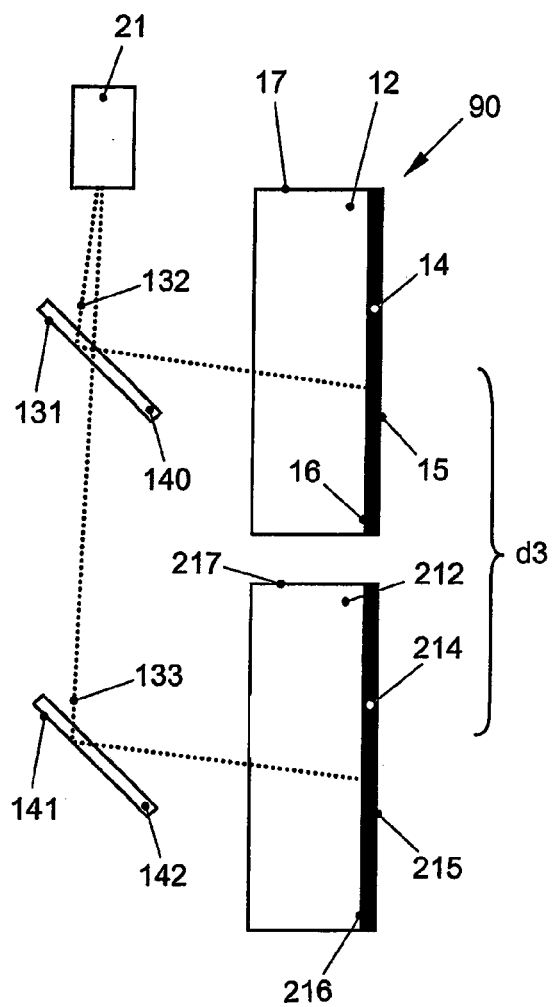
FIG. 19 is a cross-sectional view of an operator device.
Figure 20:
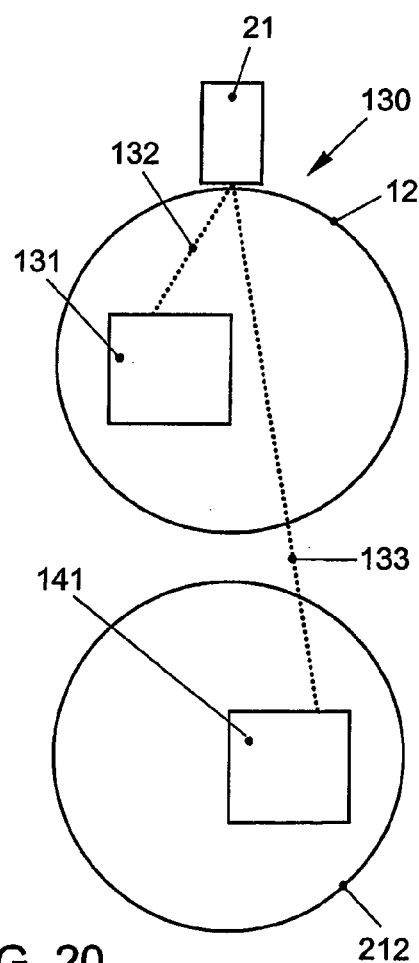
FIG. 20 is a rear view of an operator device.

FIG. 19 illustrates a cross-section of an exemplary embodiment of an operator device 130 for operating a motor vehicle. FIG. 20 is a rear view of the exemplary embodiment of operator device 130. The operator device has rotating bodies 12 and 212, which have display layers 14 and 214, may be used functionally independently from each other, and are situated at a distance d3, e.g., between 3 cm and 10 cm away from each other. Rotating body 212 has an at least partially transparent display layer 214, which rotates along in response to an angular movement of rotating body 212. Display layer 214 has a side 215 facing an operator and a side 216 facing away from the operator, as well as a side wall 217.

Different information is simultaneously displayable on display layers 14 and 214 of rotating bodies 12 and 212. The same time may mean the same time in the strict sense of the word, but the same time may also include different points in time, which are, however, so close together that the human eye perceives images, which it sees at these different points in time, as simultaneously displayed images.

Together with controllable light source 21 and mirrors 131 and 141, rotating bodies 12 and 212 form rotary knobs, which have a common, controllable light source 21 for displaying, e.g., different information on their display layers 14 and 214. As illustrated in FIG. 19, mirrors 131 and 141 are slightly inclined, so that upper side 140 of mirror 131 and lower side 142 of mirror 141 are visible. In addition, mirrors 131 and 141 are offset from each other, as illustrated in FIG. 20. In this manner, the two display layers 14 and 214 are simultaneously swept over by light beam 132. If light beam 132 is moved far enough to the right with respect to FIG. 20, it follows dotted line 133, so that display layer 214 is swept over.

In conjunction with a scattering lens, rotary knobs 90, 100, 110, and 120 illustrated FIG. 15, FIG. 16, FIG. 17, and FIG.

18, and the operator device illustrated FIG. 19 and FIG. 20, may be arranged in accordance with the exemplary embodiment illustrated in FIG. 4.

The features and layers in the figures are drawn with simplicity and clarity in mind, and not necessarily to exact scale. Thus, the orders of magnitude of certain elements or layers are depicted with considerable exaggeration as compared to other features or layers, in order to improve understanding.

LIST OF REFERENCE NUMERALS

| | |
|---|---|
| 1 | motor vehicle |
| 2 | steering wheel |
| 3 | display |
| 4 | console |
| 5, 6, 10, 20, 30, 90, 100, 110, 120 | rotary knob |
| 7 | edge |
| 8 | operating elements |
| 11 | light source |
| 12, 62, 72, 82, 212 | rotating body |
| 13 | template |
| 14, 64, 74, 84, 214 | display layer |
| 15, 215 | a side facing the operator |
| 16, 216 | a side facing away from the operator |
| 17, 217 | side wall |
| 18 | axis of rotation |
| 19, 21 | controllable light source |
| 22, 92, 102, 112, 122, 132 | light beam |
| 23, 41 | control unit |
| 24 | laser |
| 31 | scattering lens |
| 33 | double arrow |
| 40 | multifunction operating device |
| 50 | telephone screen form |
| 51 | menu line |
| 91, 101, 131, 141 | mirror |
| 111, 121 | prism |
| 113, 123 | reflecting surface |
| 130 | operator device |
| 133 | dotted line |
| 140 | upper side |
| 142 | lower side |
| d1, d2, d3 | distance |

What is claimed is:

1. A rotary knob for operating a motor vehicle by rotation of the rotary knob, comprising:
   an at least partially transparent display layer rotatable with and in response to an angular movement of the rotary knob; and
   a controllable light source adapted to display arbitrarily changeable information items on the display layer.

2. The rotary knob according to claim 1, wherein the display layer includes a side facing an operator and a side facing away from the operator, the side facing away from the operator illuminatable by the controllable light source.

3. The rotary knob according to claim 1, wherein the controllable light source is arranged in back of the display layer with respect from a side of the display layer facing an operator.

4. The rotary knob according to claim 1, further comprising a scattering light lens arranged between the controllable light source and the display layer.

5. A rotary knob for operating a motor vehicle by rotation of the rotary knob, comprising:
   an at least partially transparent display layer rotatable with and in response to an angular movement of the rotary knob; and
   a controllable light source adapted to display changeable information items on the display layer;
   wherein the controllable light source includes a laser.

6. A rotary knob for operating a motor vehicle by rotation of the rotary knob, comprising:
   an at least partially transparent display layer rotatable with and in response to an angular movement of the rotary knob; and
   a controllable light source adapted to display changeable information items on the display layer;
   wherein the controllable light source is adapted to produce a movable light beam.

7. A rotary knob for operating a motor vehicle by rotation of the rotary knob, comprising:
   an at least partially transparent display layer rotatable with and in response to an angular movement of the rotary knob;
   a controllable light source adapted to display changeable information items on the display layer; and
   a reflecting mirror adapted to deflect a light beam and arranged between the controllable light source and the display layer.

8. The rotary knob according to claim 7, wherein the deflecting mirror is curved.

9. A rotary knob for operating a motor vehicle by rotation of the rotary knob, comprising:
   an at least partially transparent display layer rotatable with and in response to an angular movement of the rotary knob;
   a controllable light source adapted to display changeable information items on the display layer; and
   a prism adapted to deflect a light beam and arranged between the controllable light source and the display layer.

10. The rotary knob according to claim 9, wherein the prism includes a curved reflecting surface.

11. An operator device for operating a motor vehicle, comprising:
    at least two rotary knobs adapted to operate the motor vehicle by rotation of the rotary knob, the rotary knobs including:
       an at least partially transparent display layer rotatable with and in response to an angular movement of the rotary knob; and
       a controllable light source adapted to display arbitrarily changeable information items on the display layer.

12. The operator device according to claim 11, wherein each rotary knob is operable in a functionally independent manner.

13. The operator device according to claim 11, wherein the display layers of the rotary knobs are adapted to simultaneously display different information items.

14. An operator device for operating a motor vehicle, comprising:
    at least two rotary knobs adapted to operate the motor vehicle by rotation of the rotary knob, the rotary knobs including:
       an at least partially transparent display layer rotatable with and in response to an angular movement of the rotary knob; and
       a controllable light source adapted to display changeable information items on the display layer;
    wherein the rotary knobs include a common light source adapted to display information on the display layers.

15. A multifunction operating device for a motor vehicle, comprising:
a display; and
at least one of:
(a) a rotary knob adapted to operate the motor vehicle by rotation of the rotary knob, the rotary knob including an at least partially transparent display layer rotatable with and in response to an angular movement of the rotary knob and a controllable light source adapted to display arbitrarily changeable information items on the display layer; and
(b) an operator device including at least two rotary knobs adapted to operate the motor vehicle by rotation of the rotary knob, the rotary knobs including an at least partially transparent display layer rotatable with and in response to an angular movement of the rotary knob and a controllable light source adapted to display arbitrarily changeable information items on the display layer;
the at least one of (a) the rotary knob and (b) the operator device adapted to at least one of (a) preselect and (b) select menu items displayable on the display.

16. The multifunction device according to claim 15, wherein menu items displayable on the display are simultaneously displayable on the display layer.

17. A steering wheel for a motor vehicle, comprising:
at least one of:
(a) a rotary knob adapted to operate the motor vehicle by rotation of the rotary knob, the rotary knob including an at least partially transparent display layer rotatable with and in response to an angular movement of the rotary knob and a controllable light source adapted to display arbitrarily changeable information items on the display layer; and
(b) an operator device including at least two rotary knobs adapted to operate the motor vehicle by rotation of the rotary knob, the rotary knobs including an at least partially transparent display layer rotatable with and in response to an angular movement of the rotary knob and a controllable light source adapted to display arbitrarily changeable information items on the display layer.

18. The steering wheel according to claim 17, wherein at least one rotary knob is arranged less than 4 cm away from an edge of the steering wheel.

19. The steering wheel according to claim 17, wherein at least one rotary knob is arranged less than 3 cm away from an edge of the steering wheel.

20. A motor vehicle, comprising:
at least one of:
(a) a rotary knob adapted to operate the motor vehicle by rotation of the rotary knob, the rotary knob including an at least partially transparent display layer rotatable with and in response to an angular movement of the rotary knob and a controllable light source adapted to display arbitrarily changeable information items on the display layer;
(b) an operator device including at least two rotary knobs adapted to operate the motor vehicle by rotation of the rotary knob, the rotary knobs including an at least partially transparent display layer rotatable with and in response to an angular movement of the rotary knob and a controllable light source adapted to display arbitrarily changeable information items on the display layer; and
(c) a steering wheel including one of (a) the rotary knob and (b) the operator device.

* * * * *